United States Patent
Mäkinen et al.

(10) Patent No.: US 6,563,801 B2
(45) Date of Patent: *May 13, 2003

(54) CABLE INTERFACE FOR DATA AND POWER SUPPLY

(75) Inventors: Jarmo Mäkinen, Espoo (FI); Ville Hämäläinen, Helsinki (FI); Antti Raimovaara, Helsinki (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/490,797

(22) Filed: Jan. 26, 2000

(65) Prior Publication Data

US 2003/0007462 A1 Jan. 9, 2003

Related U.S. Application Data (63) Continuation of application No. PCT/FI98/00592, filed on Jul. 14, 1998.

(30) Foreign Application Priority Data

Jul. 31, 1997 (FI) .................................. 973168

(51) Int. Cl.[7] ............................ H04B 1/48; H04B 1/58; H04L 5/14

(52) U.S. Cl. .................. 370/276; 370/286; 370/297; 375/140; 375/344; 375/345; 375/346

(58) Field of Search ................................ 370/276, 282, 370/286, 287, 288, 289, 290, 297; 375/140, 344, 345, 346, 349, 350, 371, 376; 379/338, 340, 344, 345, 347, 348, 398, 400, 402, 405, 413, 406.02

(56) References Cited

U.S. PATENT DOCUMENTS

| | | | | |
|---|---|---|---|---|
| 3,768,043 A | * | 10/1973 | Foldes | 333/6 |
| 4,012,590 A | * | 3/1977 | Haass | 178/58 R |
| 4,041,252 A | * | 8/1977 | Cowden | 179/170 NC |
| 4,334,128 A | * | 6/1982 | Snijders | 179/170.2 |
| 4,393,494 A | * | 7/1983 | Belforte et al. | 370/27 |
| 4,644,526 A | | 2/1987 | Wu | |
| 4,965,852 A | * | 10/1990 | Sasaki | 455/82 |
| 5,077,731 A | * | 12/1991 | Omiya | 370/30 |
| 5,436,887 A | | 7/1995 | Eisenhuth | |

(List continued on next page.)

FOREIGN PATENT DOCUMENTS

| | | |
|---|---|---|
| EP | 0680156 | 3/1995 |
| EP | 0750405 | 6/1996 |
| EP | 720306 | 7/1996 |
| WO | 93/08667 | 4/1993 |

OTHER PUBLICATIONS

2/99, International Search Report for PCT/FI98/00592.

*Primary Examiner*—Hassan Kizou
*Assistant Examiner*—Joe Logsdon
(74) *Attorney, Agent, or Firm*—Squire Sanders & Dempsey LLP (57) ABSTRACT

The cable interface unit in accordance with the invention allows use of the same wire in one cable both for base-band transmission of data between telecommunication equipment in full duplex form and also for transmission of an operating voltage (V) from one device to another. In the transmission unit, data is transmitted through a hybrid connection (41) to a cable (23). After the hybrid connection, the operating voltage (V) is also brought to the cable with the aid of a diplexer (44). The hybrid connection separates the arriving data and conducts it to the receiver, where the data is shaped in an analog manner by correcting level distortions and thereupon in the digital signal processing a DECISION is made on what the received symbol is.

12 Claims, 4 Drawing Sheets

U.S. PATENT DOCUMENTS

| | | | | |
|---|---|---|---|---|
| 5,604,747 A | * | 2/1997 | Callas | 370/297 |
| 5,729,824 A | * | 3/1998 | O'Neill et al. | 455/3.1 |
| 6,069,899 A | * | 5/2000 | Foley | 370/494 |
| 6,078,222 A | * | 6/2000 | Harris et al. | 330/295 |
| 6,130,894 A | * | 10/2000 | Ojard et al. | 370/421 |
| 6,160,571 A | * | 12/2000 | Wang | 348/10 |
| 6,185,201 B1 | * | 2/2001 | Kiyanagi et al. | 370/343 |
| 6,229,992 B1 | * | 5/2001 | McGeehan et al. | 455/78 |

* cited by examiner

CABLE INTERFACE FOR DATA AND POWER SUPPLY

This is a continuation of application No. PCT/FI98/00592, filed Jul. 14, 1998.

FIELD OF THE INVENTION

This invention concerns a cable connection through which two pieces of telecommunication equipment can send data to each other and receive data from each other and through which one piece of equipment can provide the other piece of equipment with the operating voltage it needs. The invention especially concerns a connection for connecting a unit located close to an antenna in a divided radio link and a unit located farther away with a cable connecting the units.

TECHNICAL BACKGROUND

Figure 1:
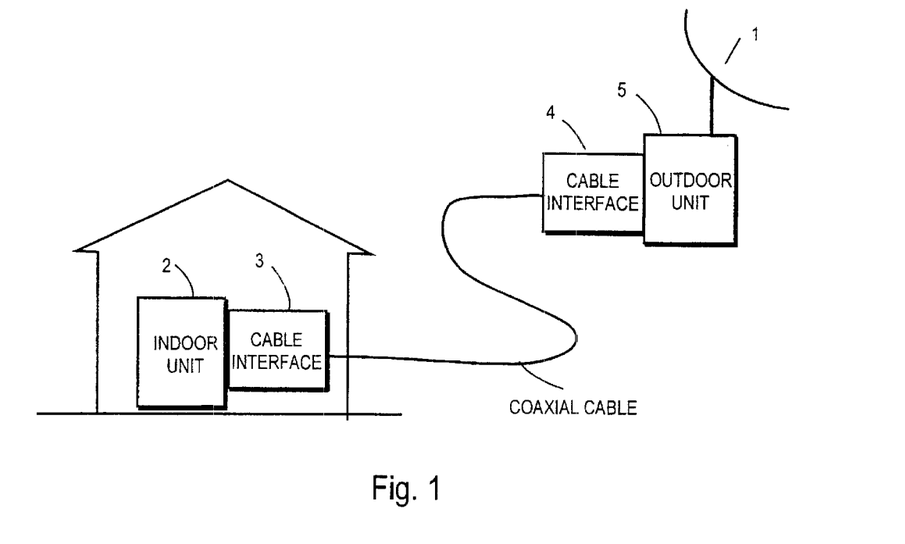
FIG. 1 shows an application environment of the invention.

FIG. 1 is a simplified view of the main parts of a divided radio link. The radio link may be e.g. a microwave link. The main parts include an indoor Unit 2 which is located in the internal space of an equipment cabinet or such and wherein processing of the received Rx signal is performed. The signal has been received by an Outdoor Unit 5 located physically close to an antenna 1. It has received a radio frequency signal from the antenna and after frequency conversion it has sent it further over the cable to the indoor unit. The indoor unit 2 in the internal space correspondingly receives a signal from the network (not shown) and leads it to the unit's transmission part Tx, which sends it further along a cable to the outdoor unit. This transmits it further to antenna 1.

Data transmission between both units takes place by way of a coaxial cable. The distance between the units, and thus the cable length, may vary from a few metres to a few hundred metres. The cable is connected to each unit by a Cable Interface CI, which adapts the data sent by the unit's transmitter to the cable and correspondingly the data from the cable to the unit's receiver.

Besides data, the cable must also transmit electric power from the indoor unit to the outdoor unit, if the latter is located in such a place, e.g. in a mast, where no own power source is available.

The problem is how in a divided radio link to transmit data and control in two directions, that is, in duplex form, and how to arrange the supply of electricity from one unit to another.

Three state-of-the-art basic solutions to the problem have been presented. According to the first solution, two separate coaxial cables are used, wherein in one cable useful data and control signals are transmitted from the indoor unit to the outdoor unit, while in the other cable the transmission is from the outdoor unit to the indoor unit. The core of one cable conducts the operating voltage from the indoor unit end as well as information transmitted by the indoor unit, while the core of the other coaxial cable conducts information received by the outdoor unit to the indoor unit.

According to another method, only one cable is used, whereby the transmission of data of either direction of transmission is modulated to some intermediate frequency.

According to a third method, one cable is also used, but signals in each direction are transmitted at different intermediate frequencies.

It is a drawback with the first method that an extra cable is needed, whereby corresponding cable adaptations are required. The method of implementation is costly. Since data is transmitted in both directions in separate cables, freedom from interference and non-existent cross-talk on the transmission path are advantages of this solution. Another advantage is the fact that baseband transmission of data is possible in both directions.

The drawback of the second method results from the circumstance that data is transmitted at an intermediate frequency in one direction. The cable interface hereby requires circuits performing up-conversion in the transmitter and down-conversion in the receiver. This entails a need for extra components on the boards, which again is a cost increasing factor. Of course, it is an advantage that only one cable is needed.

The drawback of the third method, as in the second method, is the need for extra components due to two different intermediate frequencies. Intermediate frequencies as such are available.

The present invention aims at a method and a device combining the good points of the known methods. Thus, the objective is an arrangement wherein the transmission requirement can be satisfied with just one cable and in such a way that baseband transmission of data and control signals is possible in both directions. Another objective is to transmit the supply electricity in the same cable as baseband signals.

The established objectives are achieved with the attributes presented in the independent claims.

SUMMARY OF THE INVENTION

According to the invention, the same wire of one cable is used both for transmitting data between an indoor unit and an outdoor unit as baseband transmission in full duplex form and for transmitting the operating voltage from the outdoor unit to the indoor unit. Any necessary arrangements are carried out in a cable interface CI.

The data to be transmitted which may be useful data or control data, is transmitted in the transmitter branch on the baseband through a hybrid connection to the cable, where it propagates to the unit of a distributed radio link at the other end. Correspondingly, the data which is sent by a unit at the other end arrives on the baseband on the same cable, is conducted to the said hybrid field; which separates the transmitted and received data and conducts the received data to the receiver branch. When the supply voltage is transmitted in the same cable with full duplex data, a diplexer is used between the hybrid connection and the cable end, whereby the common gate of the diplexer is connected to the cable, one gate to the voltage supply/reception point and one gate to the hybrid. Thus, the diplexer attends to separation by filtering of the supply voltage and the baseband data arriving from the cable. When using a diplexer, the analog data "rides" on top of the operating voltage in the cable to the reception end.

According to one embodiment, the hybrid field includes an inverter, which is used for forming inverted data from the data to be transmitted for echo elimination and for temporary storing and synchronising of the buffer's inverted and non-inverted data, and a circuit having a point where data and inverted data are summed so that data to be transmitted will be seen in a variation of the potential of this point. This point is a virtual zero point forming one gate of the hybrid, and the data arriving from the cable can be read at this point.

In the receiver branch, the data received from the cable is processed in the desired manner. The processing depends on the line code of the data and it may be performed in an analog or digital manner and as a combination of these.

BRIEF DESCRIPTION OF DRAWINGS

The invention will be described more closely with the aid of the appended schematic figures, wherein.

DESCRIPTION OF AN ADVANTAGEOUS EMBODIMENT OF THE INVENTION

Figure 2:
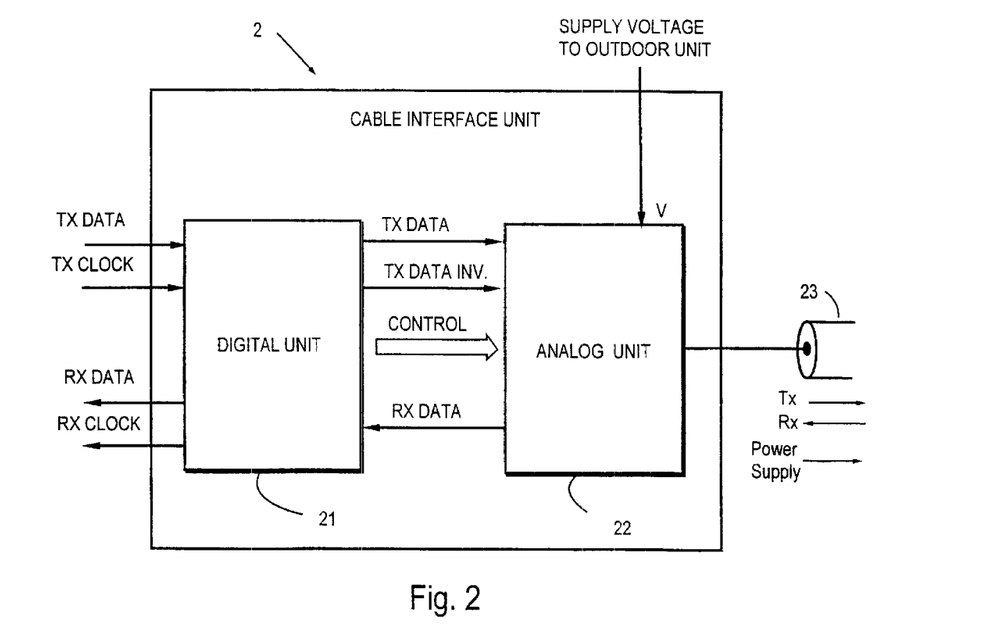
FIG. 2 is a rough view of a cable interface unit.

FIG. 2 is a rough presentation of the cable interface unit. The interface unit implements the CI (Cable Interface) between the cable and the telecommunication unit. The unit may be an indoor unit or an outdoor unit as shown in FIG. 1. The interface 2 is formed by two different blocks: the digital part 21, where all functions are digital, and the analog part 22, where correspondingly all functions are analog. All controls possibly needed by the analog part are formed in the digital part, from which they are transferred to the analog part. The interface contains arrangements, by which both data and a supply voltage can be transmitted to the same wire in one cable and, correspondingly, the data and supply voltage can be received from this same wire and separated from each other. The data may be useful data proper as well as control data. It is advantageous in many cases to implement the processing of the received data in a digital manner as far as possible, whereby the number of circuits in the analog part can be small, including only the hybrid or a part of it and the diplexer.

Inputs of the digital part are the TX Data sent by the indoor/outdoor unit and the TX Clock. The data is intended for transmission through interface 2 in an analog form to cable 23. Outputs of this part are the RX Data received from cable 23 and the RX Clock of the data.

The analog part again receives the RX Data converted to analog form from the cable and, correspondingly, it sends the analog TX Data to the cable. In addition, the analog part transmits to the cable a supply voltage V, which is intended as an operating voltage for the unit at the other end of the cable. In the case shown as an example in FIG. 1, a cable interface 3 provides the supply voltage. An important task of the analog part is to carry out separation of the transmitted and received data and the supply voltage.

The following is a description of a possible cable interface unit. This interface described as an example is constructed especially for processing of NRZ (nonreturn to zero) data. Advantages of NRZ data are that the clock is small in relation to the bit rate and the use of two levels reduces interference in the reception. The hybrid in the interface and the processing of the received signal in the example are thus designed for processing of a two-level signal. When using some other line code, the hybrid and the received signal processing blocks must be adapted in accordance with the line code. The invention does not limit the line code or the bit rate of data, although rates between 30 and 40 Mbit/s are generally used.

The following is a description of the operation of the interface unit shown as an example and intended for NRZ data when transmitting data to a cable.

Figure 3:
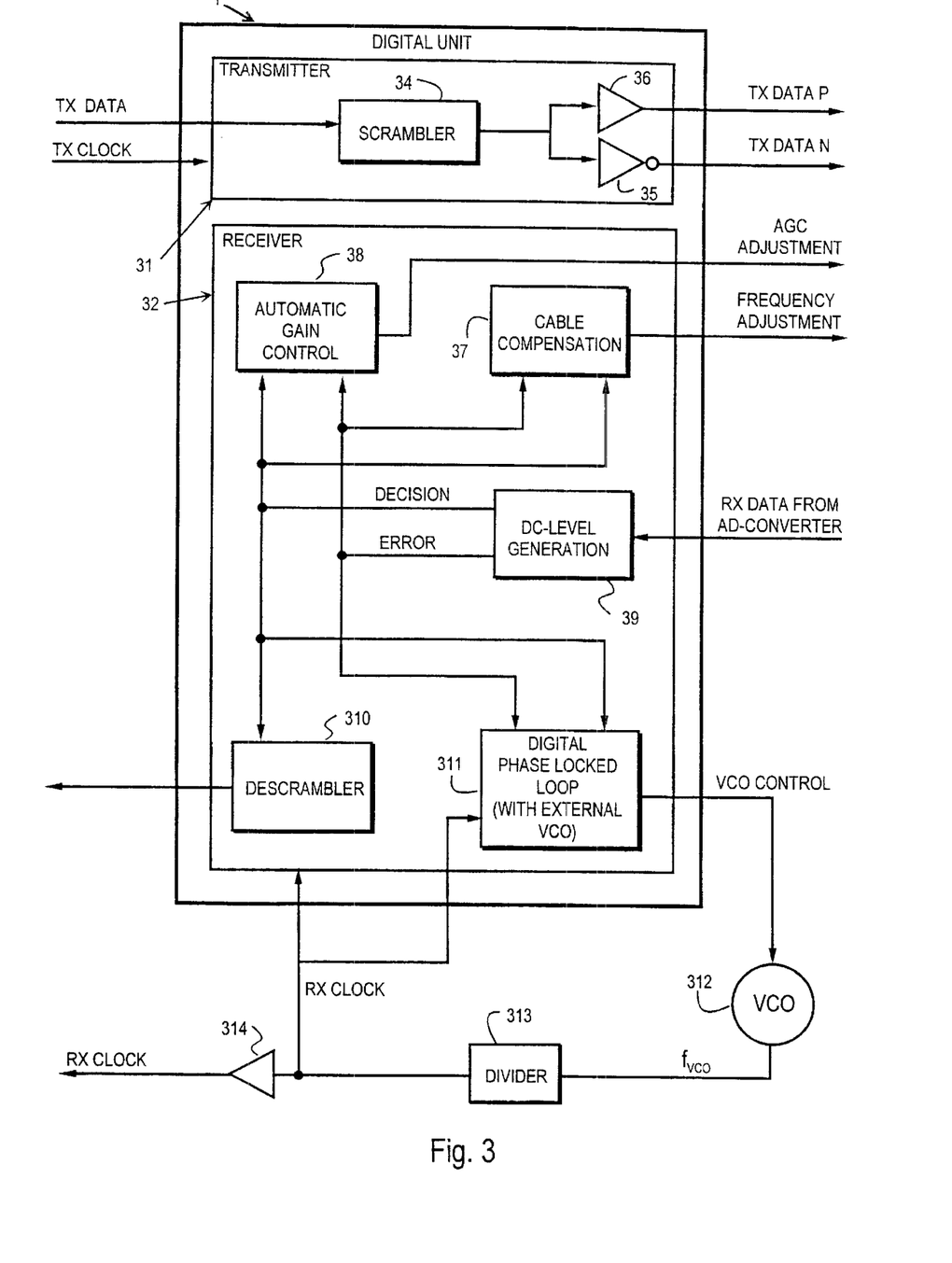
FIG. 3 is a block diagram of the digital part of the interface.

FIG. 3 shows a block diagram of the digital part. The digital part is formed by a transmitter 31 and a receiver 32. The TX Data of a NRZ type arriving from the decentralised unit is conducted to scrambler 34. The scrambler converts the incoming digital data into a pseudo-random bit string. The implementation of block 34 is very simple by using a shift register and flip-flops. It should be noted that the scrambler is not an essential block from the viewpoint of the invention, although it may be needed in practical implementations.

Figure 6:
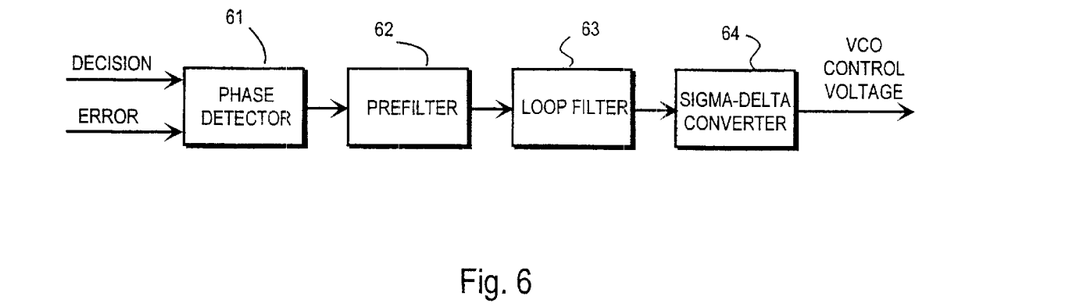
FIG. 6 illustrates formation of a clock.

The bit string arriving from block 34 is conducted to a hybrid circuit as shown in FIG. 6 including an inverting and non-inverting amplifier 35, 36, a buffer 42 and a matching network 49. The operation of the hybrid is described in the following. Referring to FIG. 3, in the hybrid the data is conducted to two parallel branches, in one of which the bit string is inverted while in the other it is not. This may be done e.g. by a non-inverting buffer amplifier 36 and by an inverting buffer amplifier 35. This results in two lines, in one of which a non-inverted TX Data P bit string travels while an inverted TX Data N bit string travels in the other. Bipolar data is needed in the hybrid circuit of the analog part, because it promotes efficient echo elimination. It is essential that the data is converted into bipolar data, because thus it is possible in the hybrid's matching network 49, FIG. 6, to form a virtual point from which received data can be led to reception circuits.

Figure 4:
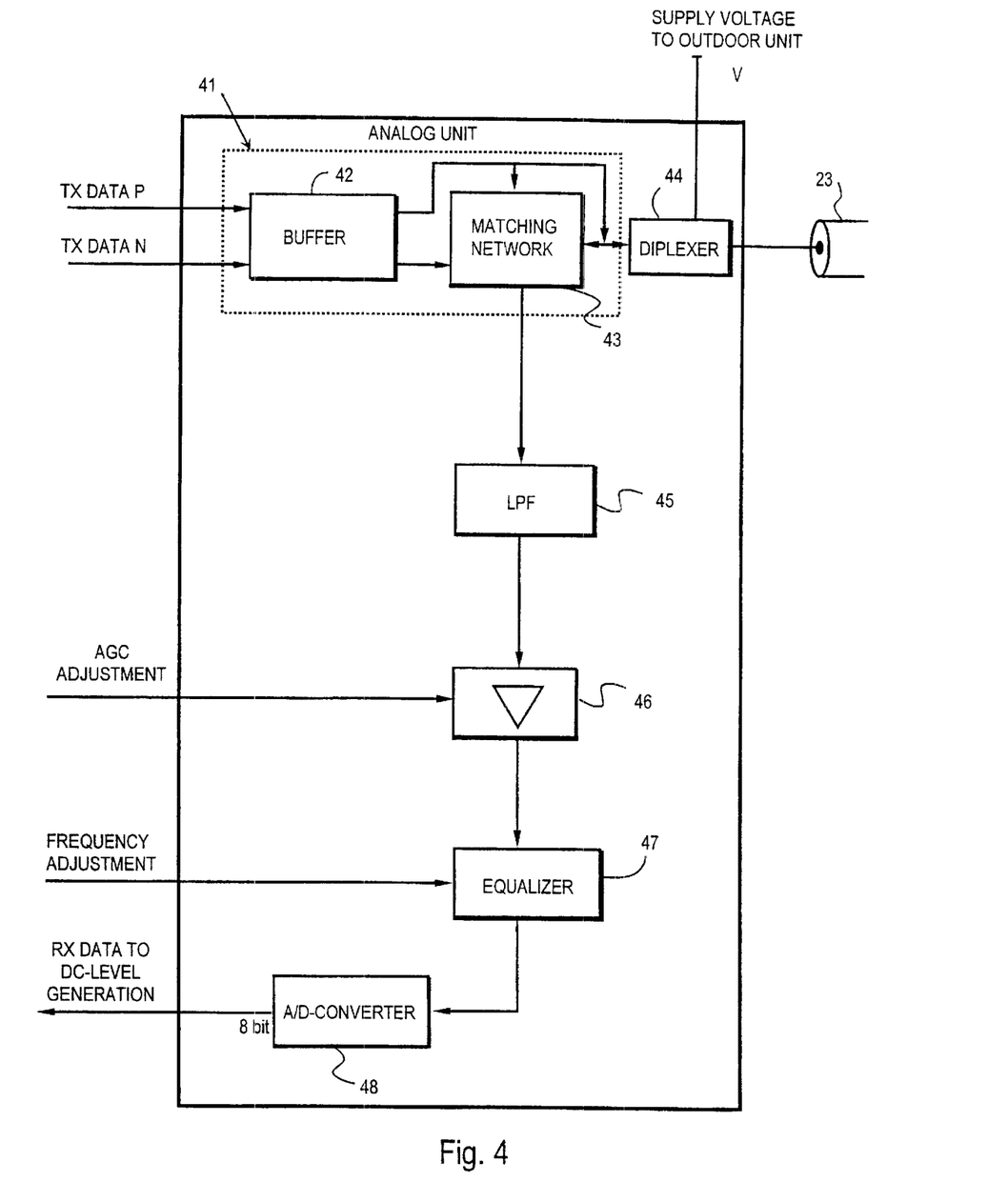
FIG. 4 is a block diagram of the analog part of the interface.

FIG. 4 shows blocks of the analog part. The operation is described further from the viewpoint of data transmitted to the cable. The Data P and inverted TX Data N bit strings arriving from the buffer amplifiers are led to buffer 42. The buffer is clocked at the Tx Clock frequency of the incoming data, FIG. 3. It is advantageous to use a buffer because in practice conductor paths of different lengths for the inverted and non-inverted data will cause delays of different lengths. By using a buffer, it is possible accurately to synchronise the inverted and the non-inverted data, whereby the effect of delays on the hybrid's operation can be prevented so that the potential of the virtual point to be described later will not vary due to the transmitted data.

From the buffer the data is led to matching network 43. Together the buffer and the matching network form a so-called forked connection 41. The principle of a forked connection is known as such e.g. from telephone technology and it may be implemented resistively as in this example or as a converter connection.

Figure 7:
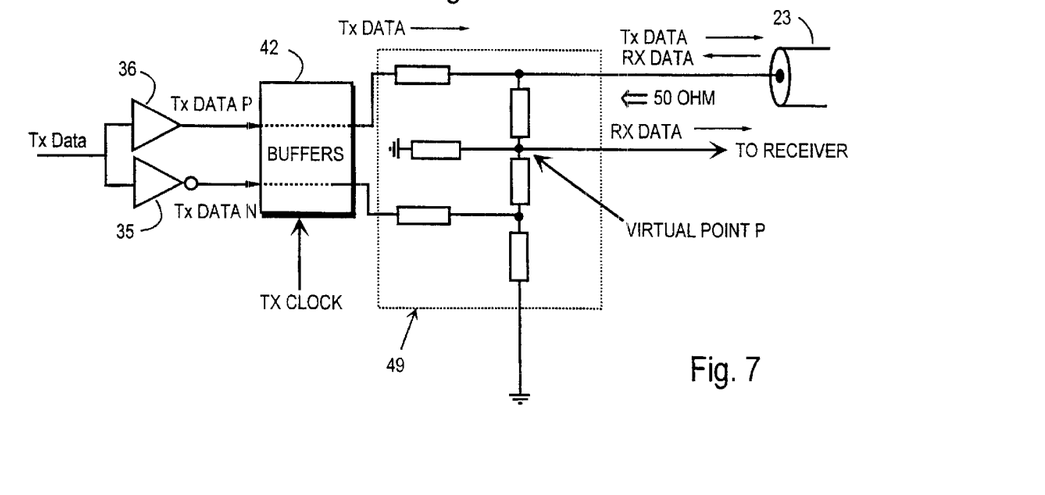
FIG. 7 shows a possible forked connection.

FIG. 7 is a more detailed view of a forked connection including a buffer and a matching network. Inverted and non-inverted data to be transmitted is led to buffers 71, which are clocked at the TX Clock frequency of the outgoing data. The matching network located after the buffers and embodied here resistively by resistors shown as boxes, is dimensioned so that looking from cable 23 it is matched to the cable impedance, here 50Ω. What is especially achieved by this dimensioning is that a virtual point P is brought about in the connection with a potential that remains the same due to the summing of non-inverted and inverted data in the point and independently of the level of transmitted Tx Data. As for this reason the voltage level at point P does not vary due to the transmission signal, only RX Data arriving from the cable will cause variation. From the viewpoint of received data, point P is the virtual zero of the transmitted data. Thus, received data can be read from the virtual point even if transmission of data is going on at the same time.

The data read from the virtual point is led to the receiver branch. The TX Data transmission signal is led from buffer 42 directly to a wire in cable 23.

According to the invention, a supply voltage intended for a unit at the other end may also be led to the cable. A diplexer filter 44, FIG. 4, is hereby located between the hybrid and the cable end. Its branch containing a high-pass filter is located between the cable and the hybrid, whereas the branch containing the low-pass filter is located between the cable and the point of supply of a DC voltage V. A supply voltage supplied from the other end of the cable may of course be separated from the same point. As the specific impedance of the diplexer is not 50Ω at all frequencies, it will cause unbalance in the receiver branch of the matching network. This can be corrected in a known manner by locating a balancing switch in the matching network (not shown).

With the mechanisms described above both the TX Data transmission signal and the supply voltage V are conducted to the same cable.

The data thus "rides" on the operating voltage. The following is a study of the operation of the cable interface unit when receiving from the cable data and a supply voltage supplied at the other end of the cable in the manner described above.

Referring further to FIG. 4. The RX Data arriving from cable 23 is separated from the supply voltage V by diplexer 44. Hereupon the hybrid circuit conducts the data according to FIG. 7 to the receiver, where the signal is shaped analogously before the signal processing performed in the digital part. The data signal is first filtered in low-pass filter 45. The filtering is done in such a way that the filtered data meets the Nyqvist criterion. This means that those frequencies are filtered away which are above the sampling frequency half. The filtering results in a low-gradient pulse shape.

The filtered data signal is then amplified in AGC (Automatic Gain Control) amplifier 46, the amplification of which is controlled by an AGC Adjustment control signal obtained from the digital part in order to correct the amplitude error. The formation of this signal will be described later. In theory, no level adjustment is required, because the low frequency attenuation in the cable is close to zero. However, in practice component tolerances will cause a need for AGC.

AGC amplifier 46 amplifies and attenuates all frequencies in the same way, and for this reason the analog signal is processed further in equaliser 47, which equalises any distortions caused to the RX Data by the transmission path. It amplifies higher frequencies. The frequency processing performed by the equaliser is controlled by a Frequency Adjustment control signal obtained from the digital part. How this signal is formed will also be described later. Frequency adjustment is needed only if it is desirable to use a long cable, wherein any distortion of the frequency resistance will grow significantly. When using a short cable, no frequency adjustment is needed.

The purpose of the processing to be performed on the received signal in the analog part is to shape the received signal in such a way that its amplitude is as stable as possible at the frequencies which are essential for the sampling to be performed next.

Finally, the shaped analog RX Data signal is led to an AD converter, which converts the analog signal into an 8 bit digital signal, which is led to the digital part of the cable interface unit. The sampling frequency is the same as the bit frequency of the arriving data signal, and the sampling frequency is formed in a manner to be presented later.

Referring to FIG. 3, the following is a description of the processing of a digitised RX Data signal. An 8 bit digitised signal arriving from the analog part is led into block 39 (DC-Level Regeneration). Regeneration must be performed for the reason that high-pass filtering has been performed in diplexer 44 in the analog part, FIG. 4, and this has caused baseline wandering of the basic level of the 2-polar data signal especially during long "0" and "1" sequences. Changes in the basic level will also result if the short-term mean of symbols is divided unevenly. Any error caused by missing low frequencies must be corrected in order to obtain a correct eye diagram. Should regeneration not be done, bit errors might occur and the restoration of timing would be difficult and would cause phase noise. In this block 39 a sample is formed again by using DC-level correction of errors as feedback. Here DC-level means certain initial data for the AD converter.

The DC-level regeneration block 39 gives two output signals, of which DECISION is a decision on whether the arriving symbol is zero or one, that is, DECISION will have a value of either 0 or 1. The decision is made solely on the basis of the sign digit of the regenerated sample. ERROR, the other output signal, is fed back to the input.

Figure 5:
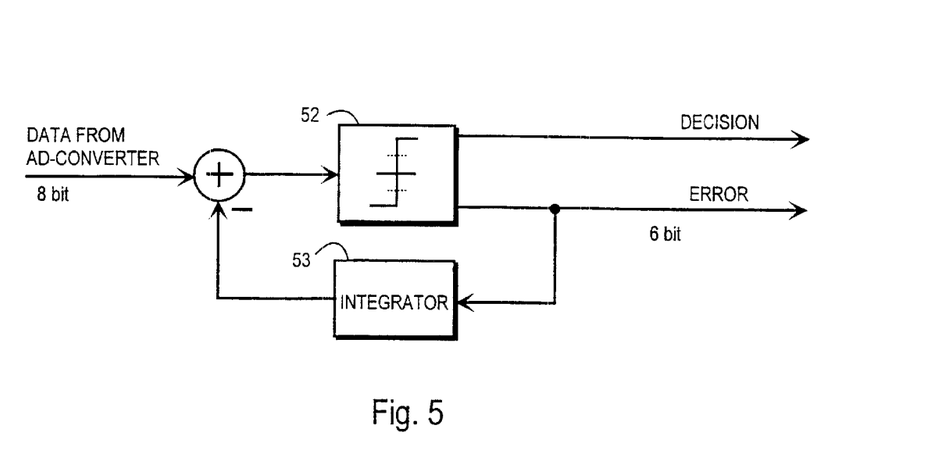
FIG. 5 shows the decision making and DC level return block.

FIG. 5 shows a regeneration block 39 of the DC level. When using an 8 bit converter, it is possible to form 256 levels (256 symbols). The definition can be made that the initial data 128 of the converter is a digital DC level and that a negative and positive input signal would be equally distant from this level. Thus, if the symbol of an AD converted signal is e.g. between 128 and (128+31), it is interpreted as one, and if the value is between 128 and (128−32), it is interpreted as zero. The interpretation is directly the DECISION output signal. Since the DC level of arriving symbols has disappeared in the filtration performed on the analog side and it must be regenerated (as a digital value) in block 52, the corrected DC level may differ from the ideal value of 128.

In order to minimise the error, block 52 includes a negative feedback branch containing an integrator 53 wherein integration is performed of the ERROR value of the signal voltage affecting the decision making. The value expresses how much the voltage was offset at the moment of sampling, provided that DECISION is correct. This error value of the signal voltage affecting the decision making is integrated and the integral is used to adjust the DC offset of the input signal of block 52.

The DECISION signal, which indicates the decision on what the received symbol is, is at the same time a received pseudo-random bit string containing real data bits. In order to find out the real data sent from the other end of the cable, the DECISION bit string is conducted to descrambler 310. It converts the pseudo-random bit string into a real bit string formed by the modulator located in the transmitter in the other end of the cable.

All circuits of the digital part and the AD converter of the analog part need a clock frequency. To form the Rx Clock from the received RX Data signal, the DECISION and ERROR signals produced by the DC level regeneration block 39 are conducted to the digital phase locked loop 311. The purpose is to separate the RX Data clock from the received data.

FIG. 6 illustrates a phase locked loop. Here the loop means a digital phase detector 61, a prefilter 62, a loop filter proper 63 and a Sigma-Delta converter 64, which are successively located. The digital phase detector may be implemented e.g. by a known Muller-Mueller algorithm. The oscillator's output frequency divided by a possible divider 313 and the DECISION and ERROR signals are conducted to the input of the phase detector. In loop filter 63 the output is converted into an analog output by the Sigma-Delta converter 64, filtration is performed in an analog filter (not shown), if required, and the final result is a control voltage of the voltage controlled oscillator (VCO) 312.

The frequency $f_{VCO}$ formed by oscillator 312 is divided in divider 313 and the divided frequency is the RX Clock frequency of the input signal which is conducted as a clock to the circuits of the digital part of the receiver and from the cable interface unit also further to another unit.

The DECISION signal, which thus is an expressed symbol, and ERROR, which is the detected error, are also used for forming AGC Adjustment and Frequency Adjustment of the AGC amplifier in the analog part and for the controls of the equaliser.

In order to form a control for the AGC amplifier of the analog part, the DECISION and ERROR signals are conducted to the Automatic Gain Control block 38. The amplitude error of the received data must be corrected and the need for correction is affected by the length of the cable between the indoor unit and the outdoor unit. The Automatic Gain Control block 38 calculates the need for amplification with the aid of input signals, and with the AGC Adjustment control signal which it has formed it adjusts the amplification of the AGC amplifier of the analog part. In principle, the loop 38 may be of the same type, as the PLL loop, except that instead of the phase detector the signals are conducted to an amplification detector. Its output signals are filtered and converted into analog form by the Sigma-Delta converter. The resulting analog signal is then filtered and the filtered AGC Adjustment voltage is supplied as a control voltage to the AGC amplifier in the analog part.

The DECISION and ERROR signals are also supplied to the Cable Compensation block 37 forming the control signal of the equaliser. Equalisation is performed in the analog part for the reason that higher frequencies will attenuate more than low ones the more the longer cable is between the units. In the equalisation, the amplitudes of high frequencies are amplified so that the amplitude-frequency curve will be as uniform as possible all the way to one-half of the sampling frequency.

The blocks 37, 38 and 311 listed above form the control signals and clock frequency of the analog part.

An analog part and digital part operating according to the principles described above are able to reconstruct an exactly similar data signal formed in a transmitter located at the other end of the cable and to generate a clock frequency from the data signal. The cable interface unit according to the invention is fully transparent to the units located at the ends of the cable.

The control signals may be transmitted as separate frames among other data flow. It is also possible to transmit control signals together with useful traffic, whereby they are transmitted with the same frequency but with a smaller amplitude close to the interface margin. The control signals can then be seen as travelling "in a subcarrier".

The method in accordance with the invention has several advantages. Firstly, when using the same cable for transmitting data and supply voltage in both directions, lower cable and installation costs are achieved. The implementation is simple and it consumes little power. The digital part can be integrated in one ASIC circuit, whereby the number of components will be lower and thus the error frequency and the Mean Time between Failures MTBF are improved.

Keeping within the scope of the claims it is of course possible to implement the component level also in other ways than in the one presented in the preferred embodiment described above. Thus, e.g. the automatic gain control AGC can be implemented as a digital control in the digital part. The PLL loop and the blocks generating the AGC-Adjustment and Frequency Adjustment controls can be implemented in any other way known to the professional than those presented above.

What is claimed is:

1. A method of transmitting information between units of a divided radio link, both units containing means of transmitting information to a cable and of receiving information arriving from the cable, the method comprising:

applying a supply DC voltage V via a diplexer to the cable at one end of the cable and extracting the supply DC voltage V from the cable via a diplexer at an opposite end of the cable;

supplying a base band transmission signal to a hybrid circuit which transmits the base band transmission signal via at least one of the diplexers to the cable;

conducting a received base band signal carrying information of an original signal arriving from the cable via at least one of the diplexers to said hybrid circuit, which transmits the received base band signal to a receiver; and shaping the received base band signal using both analog and digital signal processing in order to form a representation of the original signal, wherein base band transmission and received signals travel in full duplex form in the same cable as the supply DC voltage V.

2. The method as defined in claim 1, wherein supplying the base band transmission signal comprises:

inverting the base band transmission signal;

storing temporarily in a buffer the inverted and non-inverted transmission signals, from which they are clocked out at the same time;

supplying unchanged to the cable wire the non-inverted transmission signal;

supplying the inverted and non-inverted baseband transmission signals to a matching network, where a virtual zero point is arranged and the inverted and non-inverted base band transmission signals abort one another.

3. The method as defined in claim 1, further comprising:

converting the received base band signal in an AD converter into a digital signal;

comparing a symbol value obtained from the AD converter to a preset value representing a DC level, whereupon a decision is made on whether the received signal is logical zero or logical one, wherein the decision represents the original signal; and correcting the DC level with a correction value based on the symbol value and the preset value.

4. The method as defined in claim 3, further comprising forming digital signal processing controls which are needed in the analog shaping by using a representation of the original signal and its error.

5. The method as defined in claim 1, wherein conducting the received base band signal comprises:

supplying the received signal arriving from the cable to a matching network; and supplying the received signal from a virtual zero point to the receiver.

6. A cable interface unit for transmitting information from a unit in a divided radio link to a cable and for transmitting information received from the cable to the unit, comprising:

a hybrid circuit including:
  an inverter for inverting a digital base band transmission signal;
  a buffer for temporarily storing both a non-inverted base band transmission signal and an inverted base band transmission signal, and for clocking stored signals out at the same time, wherein the non-inverted base band transmission signal is functionally connected to the cable; and
  a matching network connected to the output of the buffer, the matching network including a virtual zero point where the inverted and non-inverted base band transmission signals arriving from the buffer abort one another and from which a received base band signal is supplied to a receiver.

7. The cable interface unit as defined in claim 6, further comprising a diplexer connected to a cable on the one hand and to the hybrid circuit on the other hand, the diplexer including a terminal via which an operating voltage is applied to the cable, the operating voltage being intended for a telecommunication device located at an opposite end of the cable, through which the operating voltage is extracted from the cable, said operating voltage being supplied by a telecommunication device located at the opposite end of the cable.

8. The cable interface unit as defined in claim 6, further comprising a digital DC level regeneration loop that receives symbols obtained by sampling an analog signal in an AD converter and compares symbol values to a preset value representing a digital DC level, whereupon a decision signal is produced and a level of the decision signal is used to determine whether the received signal is a logical 1 or 0.

9. The cable interface unit as defined in claim 8, wherein the receiver comprises:
  a first control generation loop which in response to the level of the regenerated signal and to its error forms a first control for automatic gain control adjustment;
  a second control generation loop which in response to the level of the regenerated signal and to its error forms a second control for frequency adjustment; and
  a phase locked loop which in response to the level of the regenerated signal and to its error forms a synchronised clock frequency in the received signal.

10. A divided radio link including an indoor unit, which performs processing of a received signal and transmits a transmission signal to an outdoor unit, the outdoor unit transmits the transmission signal received from the indoor unit to an antenna and the signal received by the antenna is transmitted to the indoor unit, the indoor and outdoor units comprising:
  a diplexer for applying a supply DC voltage V to or extracting a supply DC voltage V from a cable, and for conducting a signal received from the cable to a virtual zero point;
  a buffer for storing an inverted and non-inverted digital baseband transmission signals and clocking out stored signals at the same time; wherein the non-inverted baseband transmission signal is applied via the diplexer to the cable;
  a matching network for receiving the inverted and non-inverted digital baseband transmission signals from the buffer, the matching network having a point where said baseband transmission signals cancel each other, said point forming the virtual zero point;
  analog and digital signal processing means for shaping the received signal in order again to form a regenerated original signal.

11. The divided radio link as defined in claim 10, wherein control signals between the indoor unit and the outdoor unit travel as separate frames in the same cable as the transmission signal, the received signal, and the supply DC voltage V.

12. The divided radio link as defined in claim 10, wherein control signals between the indoor unit and the outdoor unit, the transmission signal, the received signal, and the supply DC voltage V travel in the same cable, the control signals having a same frequency but a smaller amplitude than the transmission signal and the received signal.

* * * * *